United States Patent

[11] 3,555,992

| [72] | Inventor | Edward L. Fritzberg<br>Minneapolis, Minn. |
|---|---|---|
| [21] | Appl. No. | 772,251 |
| [22] | Filed | Oct. 31, 1968 |
| [45] | Patented | Jan. 19, 1971 |
| [73] | Assignee | The Pillsbury Company<br>Minneapolis, Minn.<br>a corporation of Delaware |

[54] APPARATUS FOR HEATING, COOLING OR PUFFING FOOD PRODUCTS IN A DRY STATE
8 Claims, 2 Drawing Figs.

[52] U.S. Cl. .................................................. 99/345,
99/1
[51] Int. Cl. ................................................... A47j 35/00
[50] Field of Search .......................................... 99/324, 1,
100, 127, 234—35, 237—38, 238(.1), 238(.4),
238(.5), 238(.6), 238(.7), 345, 355, 416, 419;
107/43; 118/19, 20; 134/7; 259/3, 14, 30, 81

[56] References Cited
UNITED STATES PATENTS

| 1,239,399 | 9/1917 | Jewett .......................... | 118/19 |
| 2,041,175 | 5/1936 | Goodman ...................... | 99/416X |
| 2,705,450 | 4/1955 | Steinbook ..................... | 99/238.1 |
| 2,939,383 | 6/1960 | Kanaga ......................... | 99/355X |
| 3,024,538 | 3/1962 | Madsen ......................... | 259/81X |
| 3,035,918 | 5/1962 | Sorgenti et al. ............... | 99/1 |

FOREIGN PATENTS

| 107,089 | 3/1939 | Australia ....................... | 99/238.1 |

Primary Examiner—Walter A. Scheel
Assistant Examiner—Arthur O. Henderson
Attorneys—Ronald E. Lund, James V. Harmon and Paul M. Hendrickson ABSTRACT: Apparatus for cooling, dry blanching or dry puffing food products, particularly snack items by contact with a dry granular heat exchange medium such as salt contained in a heat treatment chamber composed of a cylinder mounted for rotation on a horizontal axis and provided on its interior with pockets or scoops which as the cylinder rotates elevates a solid granular heat treating medium such as hot salt to the top of the cylinder where as the scoop becomes inverted it is dumped into a centrally located longitudinally extending auger conveyor composed of a trough within which is mounted a flighted auger. The trough is provided with perforations big enough to allow the salt to fall to the bottom of the cylinder. Food pieces placed in the trough are transferred through the cylinder under the stream of cascading salt which accomplishes the required heat treatment. Potato chips are prepared by blanching slices for 20 minutes in water at 180° F., drying them to 10 percent moisture and passing them through the apparatus at 375° F. for 15 seconds.

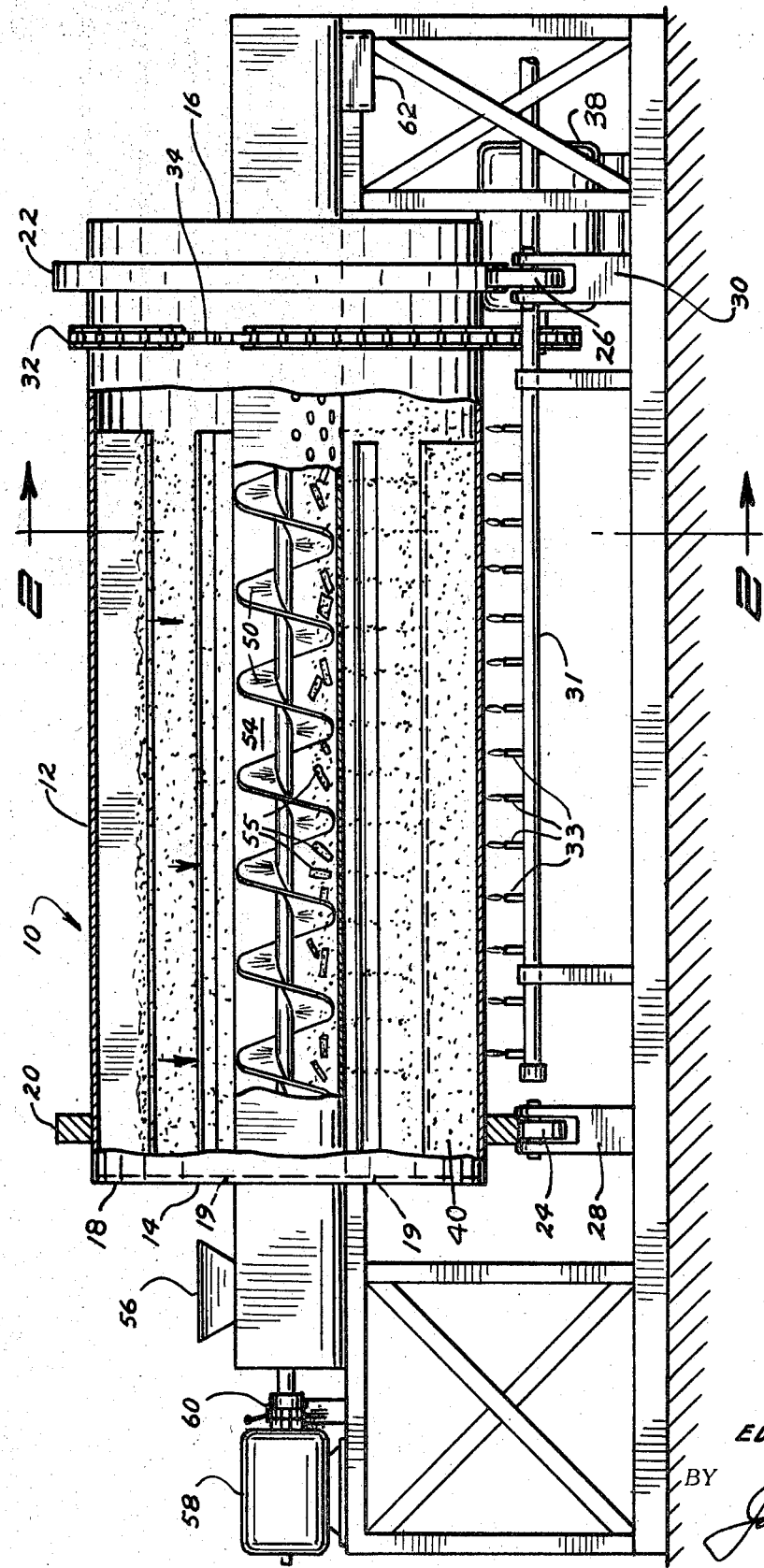

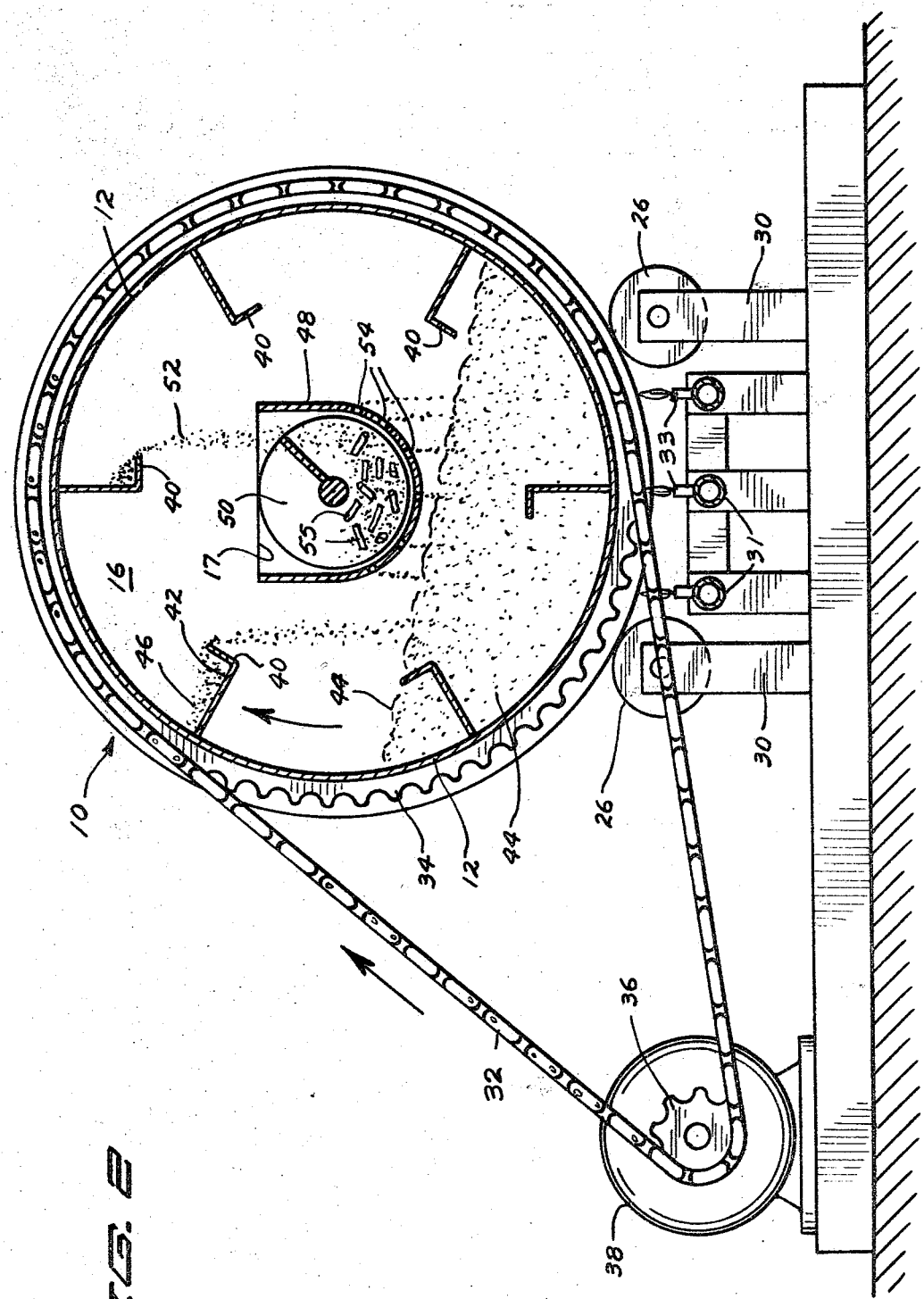

APPARATUS FOR HEATING, COOLING OR PUFFING FOOD PRODUCTS IN A DRY STATE

The present invention relates to apparatus for heating or cooling food products by contact with a dry granular or powdered heat exchange material. Apparatus previously proposed for subjecting food products to heat treatment such as the puffing of vegetable pieces with granular heated solids such as sodium chloride granules has been complicated in construction and can, under some conditions, damage the food product being treated. The processing of vegetables of a relatively high moisture content has also been unsatisfactory due to the necessity of dusting on a powder such as starch to prevent adhesion of the granular heat exchange substance. Another problem encountered in the manufacture of potato chips is a darkening or graying of the chips due to browning. To prevent this phenomenon a relatively expensive grade of potatoes having a low sugar content must be used. Another process drawback is a long frying time, on the order of 1—2 minutes. The chips, moreover, can be easily damaged because they lack strength before being puffed.

In view of these and other shortcomings of the prior art, it is a primary object of the invention to provide an improved heat treating apparatus for performing cooking, blanching, puffing or like operations on food products, the apparatus being simplified in construction through the elimination of a number of parts previously considered necessary.

Another object is to provide an improved heat treating apparatus for food products which is reliable in operation and will not damage delicate food products such as potato chips.

Yet another object of the invention is to provide an improved process for preparing puffed vegetable chips which retain good color by being exposed to controlled heat, need not be dusted with a powder during the process, can be puffed in as little as 5 seconds, can be puffed without increasing oil content before being puffed to withstand damage in the puffing equipment and will not dissolve the dry granular heat transfer medium.

FIG. 1 is a side elevational view partly in section of an apparatus embodying the invention.

FIG. 2 is a transverse sectional view taken on line 2-2 of FIG. 1.

Briefly stated, the present invention provides an apparatus for heating, cooling, dry blanching or dry puffing food products such as potato chips and snack items. It consists of a heat treatment chamber composed of a cylinder mounted for rotation on a horizontal axis including a means of heating the granular material and provided on its interior with pockets or scoops which as the cylinder rotates elevates a solid granular heat treating medium such as hot salt to the top of the cylinder where it is dumped into a centrally located longitudinally extending auger conveyor composed of a trough within which is mounted a flighted auger. The trough is provided with perforations big enough to allow the salt to fall to the bottom of the cylinder but small enough to retain the material being treated. Food pieces placed in the trough are transferred from one end of the cylinder to the other by means of the auger through the stream of cascading salt which performs the required heat treatment.

The heat treatment chamber can be thought of as a rotary kiln. The scoops or flights raise the granular exchange material to the top for gravity discharge into the auger or screw conveyor located in the center of the kiln. In a typical application, the entire cylinder or kiln is mounted on rollers in a horizontal position and is driven by an endless chain connected to a motor and engaged on a sprocket at one end of the cylinder. The centrally located screw conveyor preferably extends beyond both ends of the kiln. The product is introduced at one end of the screw conveyor and is conveyed through the kiln at a rate which will deliver it to the other end just as the heat treatment, e.g. puffing, is completed. For this purpose a variable speed drive is preferably provided on the screw conveyor to insure proper speed regulation. Heat is supplied by a burner mounted just below the rotary kiln.

To the accomplishment of the foregoing and related ends the invention then comprises the features hereinafter fully described and particularly pointed out in the claims, the following description setting forth in detail certain illustrative embodiments of the invention, these being indicative, however, of but a few of the various ways in which the principles of the invention may be employed.

As seen in the FIGS. there is shown a rotary heat treating apparatus or kiln 10 composed of a cylinder 12 having an inlet end 14 and an outlet end 16. The cylinder is provided with an end closure plate 18 on the inlet end provided with an opening 19 through which the auger extends as will be described below. Similarly, the outlet end 16 of the cylinder is provided with a suitable opening 17 (FIG. 2) through which the opposite end of the auger projects. The cylinder 12 is provided with circumferentially extending longitudinally spaced supporting rings 20 and 22 mounted on wheels 24 and 26 respectively which are in turn journaled for rotation upon supporting blocks 28 and 30 respectively. The cylinder is rotated on a horizontal axis by means of a drive chain 32 entrained over a sprocket 34 at one end and a sprocket 36 at the other end. The sprocket 36 is in turn connected to a suitable drive means such as a drive motor 38. The kiln 10 and heat exchange material is heated to the required temperature by means of a heat source 31 such as a gas burner including a plurality of longitudinally distributed gas jets 33.

Within the cylinder 12 are provided a plurality of longitudinally extending circumferentially spaced and centrally directed scoops 40 each having a pocket 42 adapted to receive a certain amount of the granular solid heat exchange material, e.g. sodium chloride crystals 44, a large mass of which is maintained in the bottom of the heat treating apparatus. As the cylinder 12 rotates the salt 44 is lifted within the pocket 42 of each successive scoop 40 as indicated at 46 of FIG. 2 and is dropped into the trough 48 of an auger conveyor 50.

As the hot salt falls from each successive scoop 40 it flows downwardly over the product within trough 48. The trough 48 is provided with openings 54 through which the salt is free to flow into the bottom of the kiln.

The product being treated such as potato chips 55 is introduced to the apparatus through a hopper 56. The auger conveyor 50 is connected to a suitable drive motor 58 and variable speed drive 60. Thus, during operation the potato chips 55 introduced to the hopper 56 are transferred from left to right as seen in FIG. 1 through the trough 48 and are continuously exposed to the cascading stream of salt.

As the food chips 55 are exposed to the heated salt they are cooked, blanched or puffed as the conditions of operation require. The speed of the auger conveyor 50 is suitably regulated by adjusting the variable drive 60. When the chips emerge from the kiln they pass to the end of the trough 48 and are allowed to fall from the trough through an outlet opening 62.

In a typical application of the apparatus, the kiln is employed for dry puffing vegetable products. In this application the vegetable is divided into thin pieces with at least one dimension small enough to provide sufficiently rapid heat transfer to uniformly puff each piece throughout its entire thickness during subsequent treatment. The term "pieces" as used herein means reducing to discrete bodies as contrasted with and distinguished from a vegetable that has been reduced to a mash or paste, i.e. in a "piece" the tissue structure of the vegetable remains intact. For the purposes of this application the term "thin" means less than three-sixteenths of an inch. The pieces are then subjected to heat treatment by moist heat such as steam or hot water at a temperature of at least 140° F. for sufficient time to substantially or completely gelatinize the starch present therein throughout the entire piece but without cooking the pieces to the point where they are weakened enough to fall apart during subsequent processing steps.

During the starch gelatinization, sugar that is present in the food piece is for the most part extracted from the piece thereby preventing excessive malliard browning during subsequent heat treatment in the dry roasting kiln described hereinabove.

After the pieces have been subjected to moist heat as described, they are dried uniformly throughout each piece to a moisture content below about 60 percent moisture and preferably below about 20 percent moisture. In the case of potatoes, I have obtained a most satisfactory result with a moisture content following the drying operation of about 20 to 3 percent or less. It should be understood, however, that some beneficial effects can be obtained with drying to as much as 60 percent content. The benefits obtained are, however, more pronounced when the product is more thoroughly dried.

The product is next suddenly and briefly exposed to intense dry heat, e.g. by placing it in the kiln 10 to heat it to a temperature of at least 212° F., which temperature is high enough to evolve vapor at such a rapid rate that the vapor expands the tissue of the potato or other vegetable by at least one-third of its original volume thereby rendering the pieces friable and crunchy when chewed. The term "dry heat" means free from water.

The present apparatus can also be used for quick freezing vegetables, fruits or other integral materials, It differs from the above description only by the substitution of refrigeration equipment for the heating unit and if desired by the use of other types of heat transfer media such as metal shot or other water insoluble granular substances. Such a system avoids the use of air as a heat transfer medium which is known to be slow acting. It, moreover, causes some dehydration of the material being frozen. It is continuous, the product being frozen before packaging.

To avoid possible adhesion of the heat transfer medium to the product, it is preferred that the product be surface dried before feeding it to the freezing apparatus.

The invention will be better understood by reference to the following examples.

EXAMPLE I

Field run potatoes are abrasive peeled conventionally. They are then cleansed and the spots and eyes removed. Next, the cleaned potatoes are sliced to approximately one-sixteeth inch thick slices. They are then cold water washed and screened to remove starch and scrap and to affect warping of slices. The sliced pieces are then steeped in water at a temperature of 180° F. for 10 minutes to gelatinize the starch and to leach out excess sugars. Next, the pieces are placed in a horizontal endless conveyor oven dryer and dried at a temperature of 150° F. dry bulb for about 30 minutes. The pieces will then have a moisture content of from about 6—13 percent moisture. This dry half-product is stable and can be stored indefinitely without deterioration if placed in bags. The half-product is allowed to equilibrate within sealed containers or controlled humidity storage room at a humidity of 75 percent.

The half-product is then dry puffed by exposing it to dry heat in the apparatus described in FIGS. 1 and 2 for 15 seconds. The salt is at a temperature of approximately 400° F. The heated product will expand to a volume about one-third greater than its original size, develop vesicles which produce the tender chewing quality of a potato. The chips are then cooled and optionally sprayed with a small amount of flavoring material such as butter or shortening and dusted with a small amount of table salt for flavor.

EXAMPLE II

The following additional products are treated as described in Example I: sweet potatoes, carrots, rutabagas, apples, parsnips and asparagus. The sweet potatoes are bright yellow to orange in color, have a favorable texture and a slight sweet potato flavor. The carrots are bright colored, crisp and have a pleasant flavor. The rutabagas are satisfactory in texture but have a rather strong odor that characterizes rutabagas. The parsnips are very crisp in texture and are very tasty. They are almost white in color.

EXAMPLE III

Shoestring potatoes are prepared exactly as described in Example I except that they are cut into long rectangular pieces having a cross section of one-eighth inch × one-eighth inch.

EXAMPLE IV

Potato chips are prepared in accordance with Example I except that the moist heat consists of steam at a temperature of 212° F. In this instance the exposure time to the moist heat is for a maximum of 15 minutes, 3 minutes being the usual optimum time.

EXAMPLE V

Potatoes are prepared as in Example I except that the heat exchange material consists of small granules of monosodium glutamate rather than sodium chloride.

It is apparent that many modifications and variations of this invention as hereinbefore set forth may be made without departing from the spirit and scope thereof. The specific embodiments described are given by way of example only and the invention is limited only by the terms of the appended claims.

I claim:

1. An apparatus for heating or cooling food products comprising a heat treatment chamber containing a solid granular heat treating medium, elevating means within the chamber for lifting the solid granular heat treating medium to the top of the chamber, a conveyor extending through the chamber for transporting the food product therethrough, a heating or cooling means in heat transfer relationship with the heat transfer medium and means for dumping the heat transfer medium onto the conveyor, said conveyor having means that will allow the treating medium to fall to the bottom of the chamber whereby food pieces placed in the conveyor are transferred from one end thereof to the other through the chamber and are exposed to a stream of cascading heat transfer medium to effect the required heat treatment.

2. The apparatus of claim 1 wherein the conveyor comprises a flighted screw conveyor extending horizontally through the center of the chamber and a drive motor operatively connected to the screw conveyor to turn the screw conveyor for advancing the food products from one end of the apparatus to the other.

3. The apparatus of claim 1 wherein the scoops comprise longitudinally extending circumferentially spaced scoops projecting centrally and rigidly secured to the inward surface of the heat treatment chamber, said chamber being rotated about a horizontal axis to thereby elevate the granular solid heat exchange material from the bottom of the heat exchange chamber to the top whereupon the scoops become inverted and allow the granular material to fall downwardly through the chamber into the contact with the food product on the food conveyor.

4. The apparatus of claim wherein the kiln comprises a horizontally disposed cylinder in a drive means operatively connected to the cylinder to rotate the cylinder about the longitudinal axis thereof.

5. The apparatus of claim 1 wherein the variable speed drive means is operatively connected to the conveyor for changing the speed thereof to thereby regulate the exposure time of the product within the kiln.

6. The apparatus of claim 1 wherein the chamber comprises a horizontally disposed cylinder, said cylinder having a plurality of circumferentially distributed longitudinally extending centrally directed scoops secured to its inward surface, said heat exchange medium comprises a granular material located at the bottom of the cylinder, means supporting the cylinder for rotation about its horizontally disposed longitudinal axis, drive means for rotating the cylinder to cause the scoops to periodically raise portions of the heat exchange medium upwardly to the top of the chamber and to drop said exchange medium onto the conveyor and said conveyor comprises a trough extending horizontally through the center of the cylinder in alignment with the axis thereof with a movable conveyor element in the trough for transporting the food products through the apparatus from one end of the chamber to the other and said trough having openings therein through which the heat exchange medium can flow back into the bottom of the cylinder.

7. The apparatus of claim 1 wherein the heating means comprises a heater positioned in heat transfer relationship with one portion of the cylinder to thereby heat the cylinder for transmitting heat to the heat exchange material therein.

8. The apparatus of claim 7 wherein the heater comprises a gas burner positioned below the cylinder in heat transfer relationship at the bottom of the cylinder for transmitting heat to the granular material located therein.